US012429735B2

(12) United States Patent
Spillmann et al.

(10) Patent No.: US 12,429,735 B2
(45) Date of Patent: Sep. 30, 2025

(54) TUNABLE PHOTOALIGNMENT

(71) Applicant: The Government of the United States of America, as represented by the Secretary of the Navy, Arlington, VA (US)

(72) Inventors: Christopher M. Spillmann, Washington, DC (US); Colin P. McGinty, Washington, DC (US); Jakub Kolacz, Washington, DC (US); Henry G. Gotjen, Washington, DC (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 0 days.

(21) Appl. No.: 17/854,055

(22) Filed: Jun. 30, 2022

(65) Prior Publication Data

US 2023/0004049 A1    Jan. 5, 2023

Related U.S. Application Data

(60) Provisional application No. 63/217,452, filed on Jul. 1, 2021.

(51) Int. Cl.
*G02F 1/1337* (2006.01)
(52) U.S. Cl.
CPC .. *G02F 1/133788* (2013.01); *G02F 1/133761* (2021.01)

(58) Field of Classification Search
CPC ................................. G02F 1/133788
See application file for complete search history.

(56) References Cited

U.S. PATENT DOCUMENTS

| 8,311,372 | B2 | 11/2012 | Anderson et al. | |
|---|---|---|---|---|
| 2001/0012082 | A1* | 8/2001 | Sang Un | G02F 1/133788 349/123 |
| 2002/0098295 | A1* | 7/2002 | Yip | G02F 1/133788 427/487 |
| 2016/0109760 | A1* | 4/2016 | Finnemeyer | G02F 1/133377 349/123 |
| 2018/0259813 | A1* | 9/2018 | Kwok | G02F 1/133788 |
| 2020/0174323 | A1* | 6/2020 | McGinty | C09K 19/04 |

FOREIGN PATENT DOCUMENTS

DE    19829231 A1 *  1/1999  ....... G02F 1/133788

OTHER PUBLICATIONS

Chrigrinov et al. (2002) Synthesis and properties of azo dye alinging layers for liquid crystal cells, Liquid Crystals 2002, 29:10, pp. 1321-1327. https://doi.org/10.1080/713935610.

(Continued)

*Primary Examiner* — Alexander P Gross
(74) *Attorney, Agent, or Firm* — US Naval Research Laboratory; Scott C. Hatfield

(57) ABSTRACT

The azo dye brilliant yellow operates to align liquid crystal molecules in three dimensions, for example to establish a desired in-plane alignment and pre-tilt angle. This technique provides a wide range selectable and re-writable pretilt angles from 0° to nearly 90°.

24 Claims, 6 Drawing Sheets
(6 of 6 Drawing Sheet(s) Filed in Color)

(56) References Cited

OTHER PUBLICATIONS

Chigrinov et al. (2005) "Photo-aligning by azo-dyes: Physics and applications," Liquid Crystals Today, 14:4, 1-15. https://doi.org/10.1080/14645180600617908.

Gwag et al. (2006) "Effect of polyimide layer surfaces on pretilt angles and polar anchoring energy of liquid crystals," J. Applied Phys. 100, 093502.

\* cited by examiner

TUNABLE PHOTOALIGNMENT

CROSS-REFERENCE TO RELATED APPLICATIONS

This application claims the benefit of U.S. Provisional Patent Application No. 63/217,452 filed Jul. 1, 2021, the entirety of which is incorporated herein by reference.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, DC 20375, USA; +1.202.767.7230; techtran@nrl.navy.mil, referencing NC 210304.

STATEMENT REGARDING PRIOR DISCLOSURES BY THE INVENTOR(S)

A prior disclosure entitled "Large, Tunable Liquid Crystal Pretilt Achieved by Enhanced Out-of-Plane Reorientation of Azodye Thin Films," Langmuir (2020) 36, 8554-8559, was made by the inventors with other named authors. Those other authors who are not named as inventors of this patent application were working under the direction and supervision of at least one of the inventors.

BACKGROUND

Uniform alignment of liquid crystals (LCs) is a prerequisite for almost all optical applications including LC displays, refractive beam steering, LC polarization gratings (LCPGs), and q-plates]. LC alignment is also a fundamental part of non-optical applications such as LC elastomer 'origami', controlled placement of colloidal particles, and control of active matter. Many of these applications benefit from or require the ability to control and pattern the azimuthal, or in-plane, orientation of the LC director. Of the many alignment techniques that have been developed, photoalignment, i.e. casting a thin film of organic material and exposing it to light, is an attractive method offering full control over the azimuthal angle by simply controlling the polarization state of the alignment exposure; this is typically accomplished through holography or direct-write methods. Control over the polar orientation, or LC pretilt, of the LC director, however, has proven more challenging since it requires manipulation out of the plane with respect to the substrate.

For nematic LC mixtures, alignment has been achieved using a variety of mechanical, chemical, and optical methods to manipulate the surface and induce long-range alignment of the LC—both in the plane of the surface (azimuthal alignment) and out-of-plane (polar pretilt angle). Each alignment method has its advantages and drawbacks, but ultimately an ideal LC alignment layer should be achievable with minimal processing to provide uniform and user-defined control of the in-plane and out-of-plane LC orientation with strong surface anchoring.

Full control of the LC pretilt (0-90°) has been achieved by several methods utilizing polyimides. These include altering the chemical structure of the polyimide, using a combination of polyimides that induce homeotropic (perpendicular to the substrate) and planar (parallel to the substrate) alignment, and modification of the polyimide film with focused ion beam. However, these methods retain the general drawbacks associated with using polyimides including buildup of static charge, surface contamination, a necessary high temperature imidization step, and difficulty in patterning azimuthal alignment One attractive alternative method for LC alignment control is photoalignment (PA), wherein a thin film of a particular material, typically incorporating one of more azo-chemical moieties, is deposited on the surface of interest and exposed to polarized light to induce a preferred molecular alignment of the film and, consequently, the LC material. These organic PA materials are documented to provide uniform LC alignment, strong surface anchoring, and minimal processing. Therefore, they are an attractive LC alignment layer for electro-optics research and applications.

A need exists for improved techniques for patternable out-of-plane photoalignment, particularly techniques that allow for in-situ rewriting for spatial and temporal control over LC.

BRIEF SUMMARY

In a first embodiment, a method of photoalignment comprises applying an alignment film comprising brilliant yellow (BY) to a substrate; exposing the alignment film to a linearly polarized light source with a wavelength between 400-550 nm; and then exposing the alignment film to obliquely incident unpolarized light, thereby establishing a pretilt angle.

A further embodiment includes the method of the first embodiment wherein the exposure to unpolarized light is made in situ in the presence of liquid crystal to create a pretilt angle therein.

Another embodiment is a liquid crystal apparatus comprising a substrate, an alignment film of brilliant yellow (BY) in contact with the substrate, and liquid crystal molecules in contact with the alignment film, wherein the liquid crystal molecules have a re-writable pretilt angle anywhere in the range of 0° to 90°.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4A is adapted from Chigrinov et al. (2005) showing the limits of pretilt when using the azo-dye SD1. FIG. 4B provides data using the azo-dye BY as a photoalignment layer.

DETAILED DESCRIPTION

Definitions

Before describing the present invention in detail, it is to be understood that the terminology used in the specification is for the purpose of describing particular embodiments, and is not necessarily intended to be limiting. Although many methods, structures and materials similar, modified, or equivalent to those described herein can be used in the practice of the present invention without undue experimentation, the preferred methods, structures and materials are described herein. In describing and claiming the present invention, the following terminology will be used in accordance with the definitions set out below.

As used herein, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

As used herein, "pretilt angle" refers to the average angle at which the long axis of the LC molecules deviate from the substrate surface. A pretilt angle of 0° (long axis of LC molecule parallel to the surface) is termed planar alignment and a pretilt of 90° (long axis of LC molecule normal to substrate surface) is termed homeotropic alignment.

Overview

As described herein, the azo-dye Brilliant Yellow (BY) operates as a superior photoalignment (PA) layer in a two-step exposure method to achieve a wide range of pre-tilt angles for liquid crystal (LC) materials at a user prescribed in-plane (azimuthal) orientation and out-of-plane (polar) pretilt, i.e., the angle that the LC director makes with respect to the LC-substrate interface. The degree of out-of-plane pretilt is user-defined by setting the angle of a second unpolarized exposure with respect to the substrate surface, and the full range of pretilt from 0° to 90° was demonstrated.

Figure 1A:
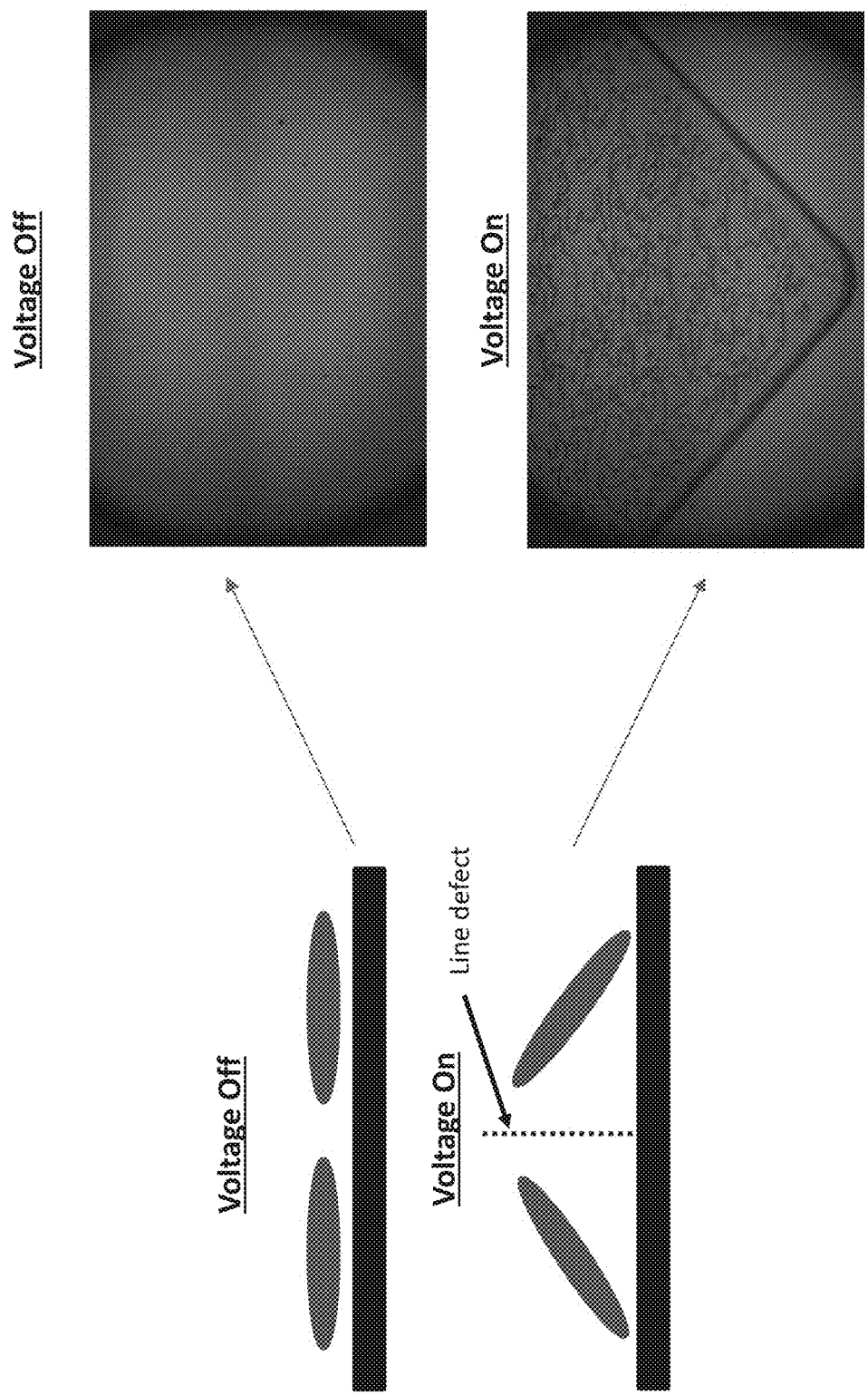
FIGS. 1A and 1B illustrate the effects of the absence (FIG. 1A) and presence (FIG. 1B) of pretilt in electro-optic applications.
Figure 1B:
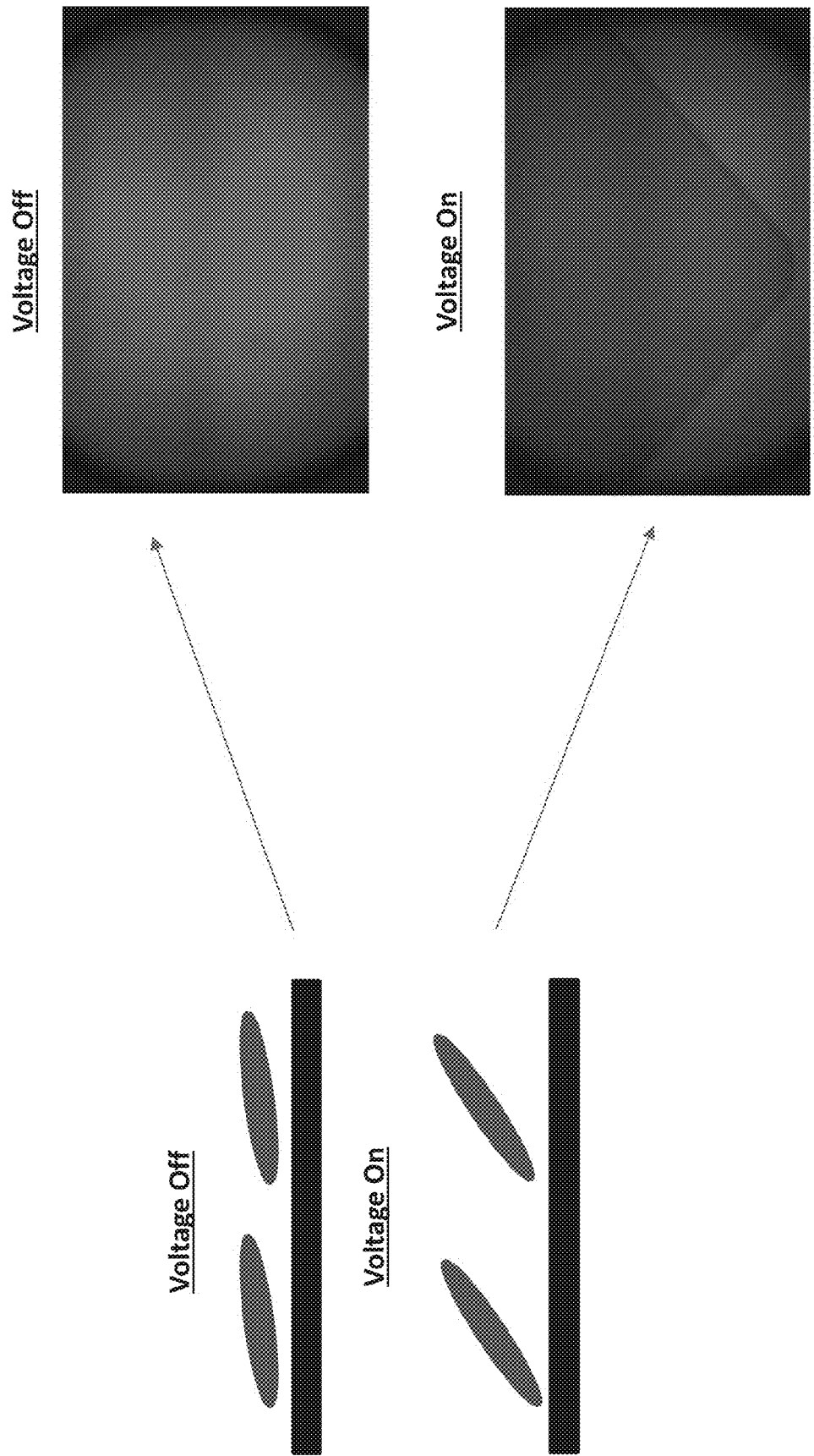

In voltage-tuned or switchable devices, the pretilt acts to optimize the reorientation of the nematic LC. For homogeneous planar alignment, such as after the first polarized exposure of BY film, the pretilt angle is effectively 0° and results in degenerate lowest energy states when a voltage is applied across the LC. It may produce reverse tilt disclinations which serve as sources of scattering loss and, therefore, degraded performance. FIGS. 1A and 1B illustrate the use of LC pretilt in electro-optic applications. As illustrated in the schematic depiction on the left of FIG. 1A, without pretilt, liquid molecules are oriented in a planar fashion flat on the surface when a "voltage off" condition exists. As a result, upon the application of voltage as seen in the images on the right in FIG. 1A, symmetry defects become manifest as disclinations or line defects, leading to problems such as scattering, surface memory, and the like. In contrast, as seen in FIG. 1B, the presence of pretilt in the voltage off condition can reduce or even eliminate such defects.

EXAMPLES

Brilliant Yellow Processing and Exposure

A thin layer of the photoaligning azodye brilliant yellow (BY) was deposited and processed on a substrate surface to induce LC alignment at a user-defined azimuthal orientation and polar pre-tilt angle.

Thin uniform films of BY on a surface are achieved by spincoating a dilute solution of the dye dissolved in a polar solvent such as dimethylformamide (DMF). Typical concentrations are 0.1%-3% BY by weight. Spincoating at 3000 rpm leaves very uniform films with thicknesses between 3 nm and 60 nm obtainable.

It was determined that a concentration of BY in DMF of about 0.6% served to optimize the BY layer thickness such that sufficient BY is deposited to induce uniform alignment on the substrate surface. The BY solution was passed through a 0.2 μm filter to remove particles that might contribute to scattering defects and degrade the quality of the LC alignment.

Once deposited on the substrate surface, the BY alignment layer was then exposed to a linearly polarized light source with a wavelength between 400-550 nm, which overlaps with the absorption spectrum of BY, and an intensity ~10-100 mW/cm$^2$ for a period of five minutes.

Figure 2:
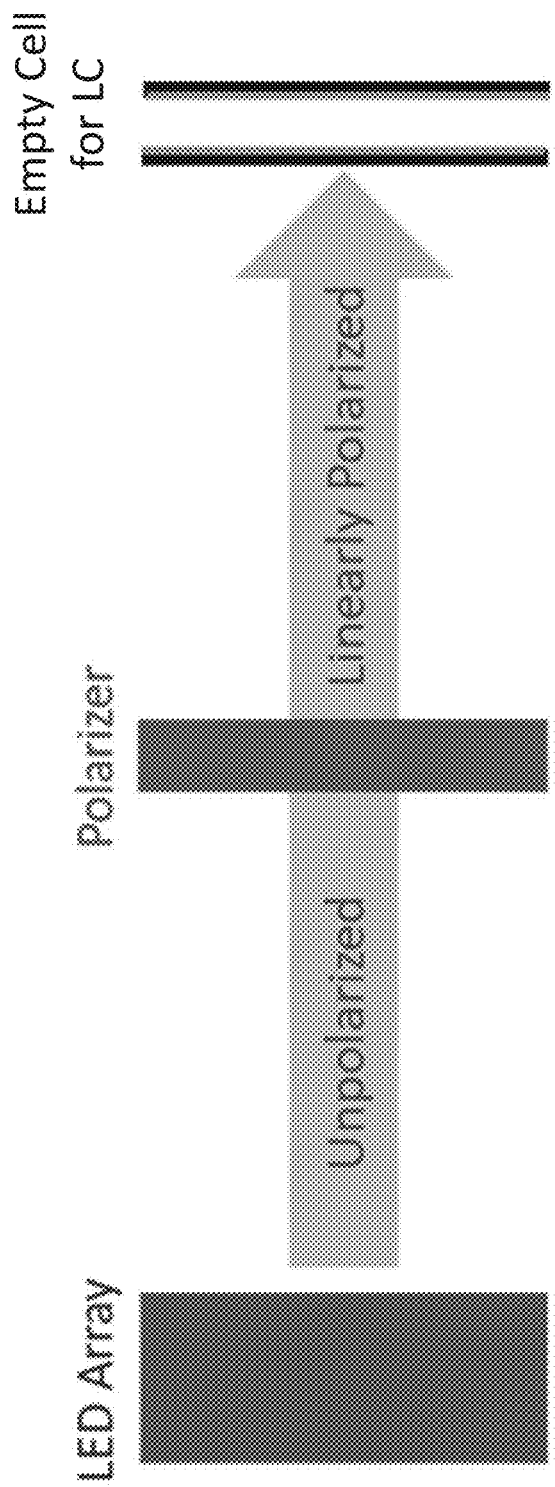
FIG. 2 presents a schematic of an exposure system for obtaining homogeneous planar alignment of the liquid crystal in an empty cell composed of two encapsulated substrates (black), each coated with a BY film (orange).

FIG. 2 provides a schematic of one exemplary exposure system. The orientation of the polarized exposure may be user-defined at an arbitrary angle to impart uniform planar (azimuthal) alignment.

The BY photoalignment layer is also capable of imparting a controllable polar pretilt angle, i.e., the angle that the LC director makes with respect to the LC-substrate interface. The symmetry at the LC-BY interface can be broken by performing a second exposure to the BY film (either before or after the LC fill) at an oblique angle with an unpolarized light source (FIG. 5). The pretilt angle can be modulated by controlling the incident angle of this unpolarized exposure since the BY (and thus LC) molecules will orient out of the plane of the substrate surface and along the propagation direction of the unpolarized exposure. In general, it is noted that optimization of the light collimation and precision of the angular exposure results in greater uniformity while higher power and an optimized exposure power/time improve the quality of LC alignment.

Figure 3:
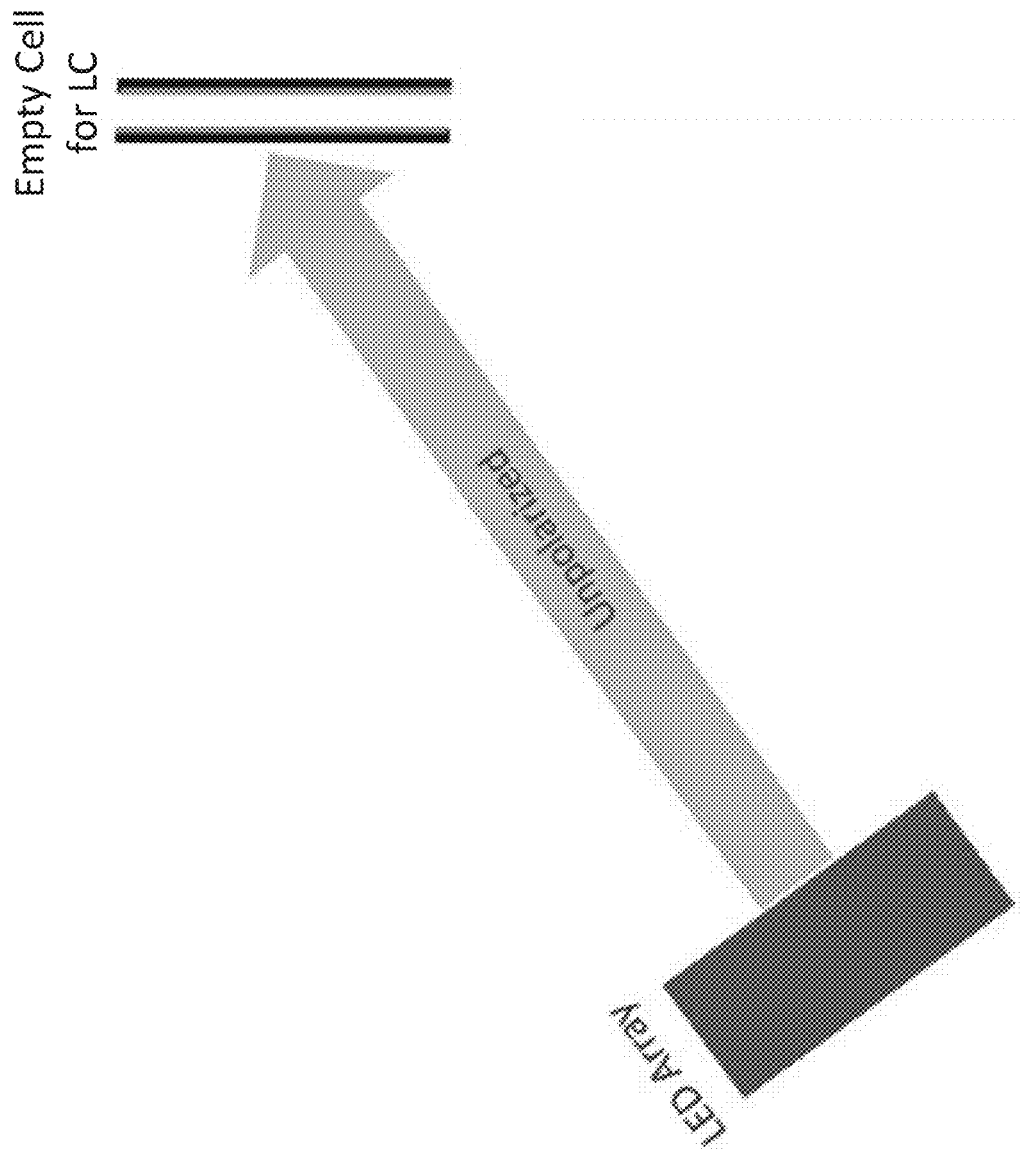
FIG. 3 presents a schematic of an exposure system for obtaining LC alignment with non-zero pretilt angle in an empty cell composed of two encapsulated substrates (black), each coated with a BY film (orange).

In one embodiment of a basic electro-optical device (a standard LC cell as depicted in FIGS. 2 and 3), light is transmitted through the LC-filled cell, where the LC has been aligned in-plane and out-of-plane according to the BY exposure conditions. If an electrode is added to each surface, a voltage may be applied to the LC within the cell such that nematic LC reorients thereby modulating the optical properties with respect to the transmitted light. Removal of the voltage restores the LC to its previously aligned state as defined by the surface anchoring strength and in-plane and out-of-plane alignment conditions of the BY layer.

Exposure of BY Films in Contact with LC

In the establishment of pretilt, it was found exposure to obliquely incident unpolarized light with the LC already in contact with BY, a greater range of pretilt was obtainable.

A BY alignment layer was coated onto glass as described above. Substrates were then assembled into cells utilizing 5 μm silica sphere spacers and Norland Optical Adhesive 65

(Norland Products, Inc.). After assembly, the optical adhesive was cured by a localized UV exposure to prevent damaging of BY film.

After cell-assembly the initial photo-alignment was performed by exposure to a linearly polarized 435 nm source at an intensity of 25 mW/cm$^2$ for 5 minutes utilizing a Luxeon Rebel Tri-Star LED (Luxeon Star LEDS). Following exposure, the cells were filled with E7 (Merck KGaA) in the isotropic phase at 80° C. by capillary action and cooled slowly to room temperature in the nematic phase. Next, samples were exposed to obliquely incident unpolarized light at an intensity of 100 mW/cm$^2$ for 10 minutes. The oblique exposure was performed utilizing a 415 nm ThorLabs Solis LED source.

Samples were characterized by collecting polarized absorbance spectrum of the BY films as well as pretilt measurements of the filled cells after oblique exposure. Polarized absorbance spectrum were collected using an Ocean Optics USB4000 Spectrometer and a Glan-Thompson prism to control the input polarization. The pretilt angle was determined by measuring the retardation of the sample for varying angles of incidence utilizing the Senarmont technique as described in Bloss (1981). The birefringence data was then fit to the theoretical prediction for the angular-dependent retardation of an LC sample with arbitrary pretilt angle as described in Gwag (2003).

Figure 4B:
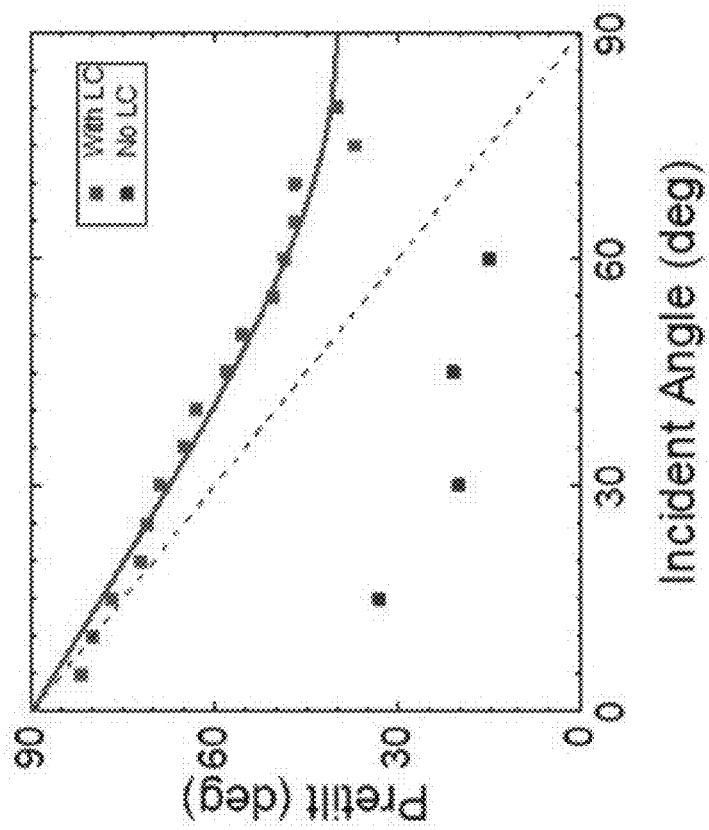
FIGS. 4A and 4B provides comparative data for photoalignment techniques.
Figure 4A:
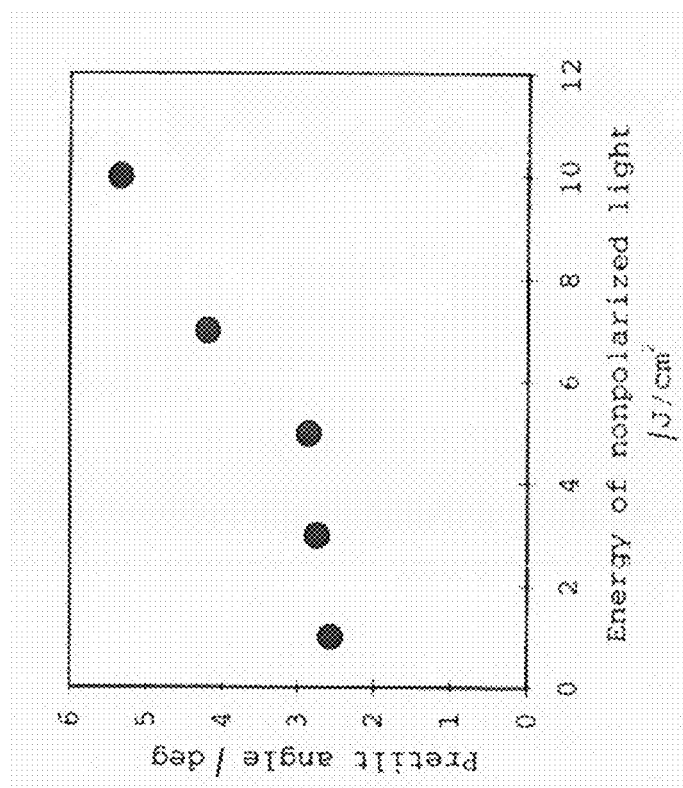

FIGS. 4A and 4B provide comparative data for photoalignment techniques. FIG. 4A is adapted from Chigrinov et al. (2005) using the azo-dye SD1, showing that pretilt angles limited to no greater than 6 degrees could be when using SD1. In contrast, FIG. 4B provides data using BY as a photoalignment layer, either exposed without the presence LC or in situ (meaning with BY in contact with LC molecules), showing the achievability of greater pretilt angles, up to nearly 90 degrees in the case of the in situ exposure.

Figure 5A:
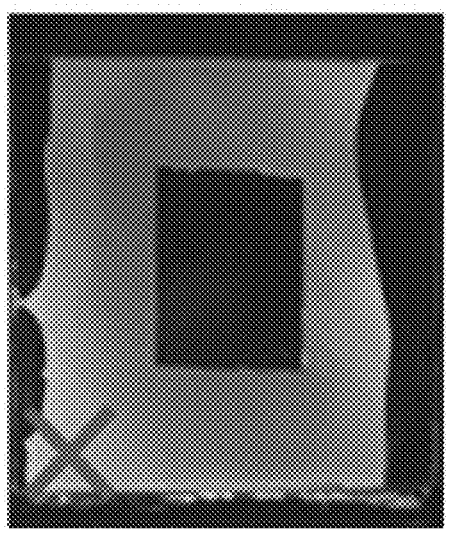
FIGS. 5A and 5B demonstrate patterning of pretilt angle with a single alignment film.
Figure 5A:
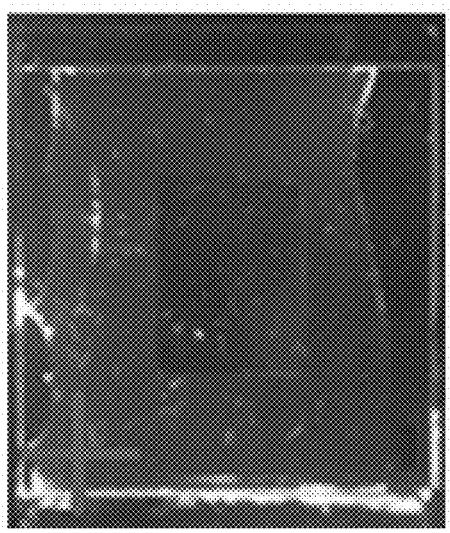
Figure 5B:
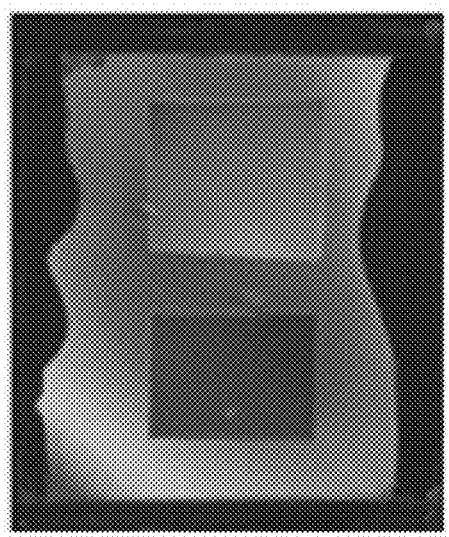
Figure 5B:
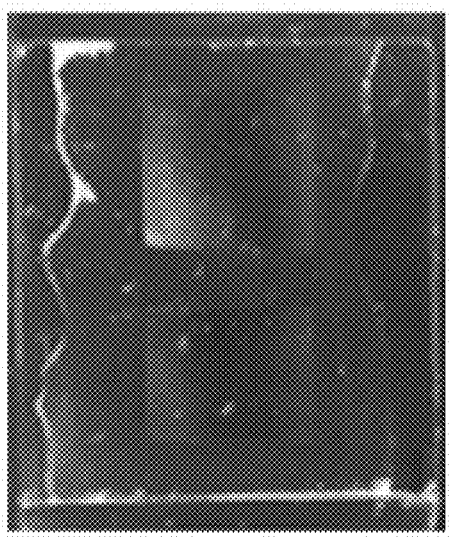

The ability to pattern a broad range of pretilt angle with a single BY alignment film is shown in the images provided in the polarized optical microscopy images in FIGS. 5A and 5B. In FIG. 5A, the central region received unpolarized exposure near normal incidence and the cell exhibits both homeotropic (90° pretilt) and planar (0° pretilt) alignment. In FIG. 5B, central regions received oblique exposure at two different angles of incidence and the cell exhibits planar alignment with zero pretilt, 60 degree pretilt, and 50 degree pretilt. Note the orientation of crossed polarizers in each row of the figure is indicated in the upper left of FIG. 5A.

Figure 5C:
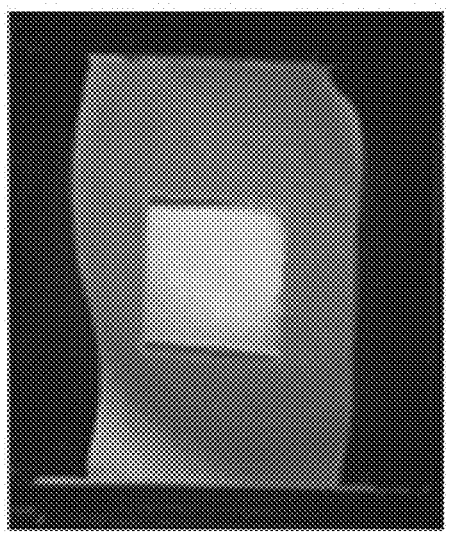
FIG. 5C demonstrates rewritability of the pretilt. In these images, the + and × refer to the orientation of the crossed linear polarizers (polarizer and analyzer, P&A) when the image was collected. Here, incident light passes through a first polarizer, then through the sample, then the second polarizer (also referred to as the analyzer). When the P&A are crossed and the sample does not manipulate the light, light transmission is reduced to zero. If the sample interacts with light and alters the polarization state of the light, the samples will cause some light to transmit.
Figure 5C:
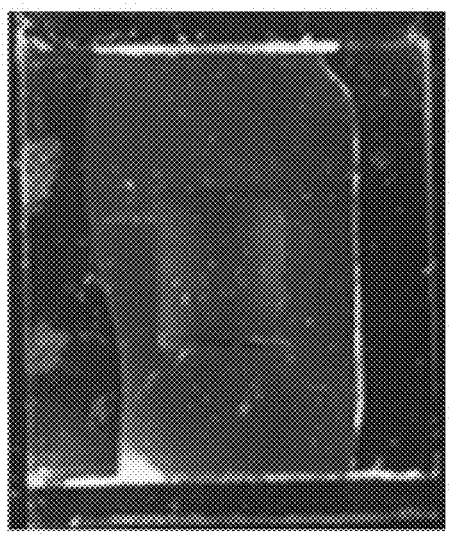

It was further found that the pre-tilt angle was re-writable, such that a second additional exposure to obliquely incident unpolarized light could establish a new pre-tilt angle. FIG. 5C shows sample that first received an exposure with angle of incidence ($\theta_i$)=10° followed by an exposure with $\theta_i$=40°; the pretilt angles measured after these exposures were 77° and 68°, respectively. This demonstrates the potential to re-write the pretilt angle while retaining a uniform LC texture. The experiment was also conducted in the reverse order with an initial exposure at $\theta_i$=40° and a subsequent exposure at $\theta_i$=10°. The pretilt angle measured after these exposures was 60° and 79°, respectively. The ability to easily re-write the LC pretilt in situ with a second exposure (and likely even more exposures) provides another advantage.

Further Embodiments

In various aspects, one or more electrodes configured to apply a voltage to the LC molecules are included in an apparatus as described herein.

It is expected that the advantages provided by in situ exposure technique could be expanded to any number of electro-optic devices including, but not limited to refractive waveguides, optical modulators, optical switches, and optical displays.

As an alternative to BY, the photoalignment material could be another organic material able to induce the contactless alignment of LC materials following exposure to light.

The photoalignment material may be deposited in any manner that produces a thin film.

The liquid crystal material may be any nematic or higher-order phase material providing optical modulation.

Advantages

The photoalignment method on substrate surfaces disclosed here offers several improvements: contact-free processing, highly uniform LC alignment with control of the azimuthal and polar alignment of the LC at a user-defined orientation, strong surface anchoring conditions (resulting in faster LC switching speeds), and the ability to easily control the planar orientation and pretilt angle. Combined, these lead to significant improvements in device performance and throughput efficiency The use of a single material, BY, as a photoalignment layer represents a significant advantage over prior art techniques that require multiple materials. Moreover, there is no need for mechanical contact, such as brushing, in order to achieve the alignment.

Concluding Remarks

All documents mentioned herein are hereby incorporated by reference for the purpose of disclosing and describing the particular materials and methodologies for which the document was cited.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

REFERENCES

Bloss, D. "The Spindle Stage: Principles and Practice," Cambridge University Press: Cambridge, 1981, pp 265-272.

Chrigrinov et al. (2002) "Synthesis and properties of azo dye alinging layers for liquid crystal cells," Liquid Crystals 2002, 29:10, Pages 1321-1327.

Chigrinov et al. (2005) "Photo-aligning by azo-dyes: Physics and applications," Liquid Crystals Today, 14:4, 1-15

Gwag, J., Lee, S., Park, K., Park, W, Han, K., Jhun, C., Yoon, T., Kim, J., Song, D., and Shin, D. Journal of Applied Physics, 93, 4936 (2003).

What is claimed is:

1. A method of tunable photoalignment comprising:
   applying an alignment film comprising brilliant yellow (BY) to a substrate;
   exposing the alignment film to a linearly polarized light source with a wavelength between 400-550 nm;
   placing liquid crystal (LC) molecules in contact with the alignment film to create an LC assembly;
   exposing the LC assembly to first obliquely incident unpolarized light at a first oblique angle of incidence relative to a surface of the substrate to establish a first pretilt angle in the liquid crystal molecules; and exposing the LC assembly to second obliquely incident unpolarized light at a second oblique angle of incidence relative to the surface of the substrate to establish a second pretilt angle in the liquid crystal molecules, wherein the first and second oblique angles of incidence are different, and wherein the first and second pretilt angles are different.

2. The method of claim 1, wherein the BY is patterned with dissimilar regions of pretilt.

3. The method of claim 1,
wherein exposing the LC assembly to the first obliquely incident unpolarized light comprises exposing the LC molecules on a region of the substrate to the first obliquely incident unpolarized light to establish the first pretilt angle in the liquid crystal modules on the region of the substrate, and
wherein exposing the LC assembly to the second obliquely incident unpolarized light comprises, after exposing the LC molecules to the first obliquely incident unpolarized light, exposing the LC molecules on the region of the substrate to the second obliquely incident unpolarized light to establish the second pretilt angle in the liquid crystal modules on the region of the substrate to provide temporal control of LC molecule pretilt angles on the region of the substrate.

4. The method of claim 1,
wherein exposing the LC assembly to the first obliquely incident unpolarized light comprises exposing the LC molecules on a first region of the substrate to the first obliquely incident unpolarized light to establish the first pretilt angle in the liquid crystal modules on the first region of the substrate, and
wherein exposing the LC assembly to the second obliquely incident unpolarized light comprises exposing the LC molecules on a second region of the substrate to the second obliquely incident unpolarized light to establish the second pretilt angle in the liquid crystal modules on the second region of the substrate to provide spatial control of LC molecule pretilt angles on the first and second regions of the substrate.

5. The method of claim 1, wherein the first pretilt angle is in a range of at least 40° up to 90°, and wherein the second pretilt angle is in a range of at least 40° up to 90°.

6. The method of claim 1, wherein the first oblique angle of incidence is greater than the second oblique angle of incidence, and wherein the first pretilt angle is less than the second pretilt angle.

7. The method of claim 1, wherein the first oblique angle of incidence is less than the second oblique angle of incidence, and wherein the first pretilt angle is greater than the second pretilt angle.

8. The method of claim 1, wherein exposing the alignment film to the linearly polarized light source provides azimuthal alignment of the LC molecules.

9. The method of claim 1, wherein the first and second pretilt angles are angles of deviation from the plane of the substrate.

10. A liquid crystal apparatus comprising:
a substrate;
an alignment film of brilliant yellow (BY) in contact with the substrate; and
liquid crystal molecules in contact with the alignment film,
wherein the liquid crystal molecules have a re-writable pretilt angle of at least 40° up to 90°.

11. The liquid crystal apparatus of claim 10, configured as a cell, waveguide, optical modulator, optical switch, or optical display.

12. The liquid crystal apparatus of claim 10, wherein the liquid crystal molecules on a first region of the alignment film have a first pretilt angle of at least 40°, wherein the liquid crystal molecules on a second region of the alignment film have a second pretilt angle of at least 40°, and wherein the first and second pretilt angles are different.

13. The liquid crystal apparatus of claim 10, wherein the re-writable pretilt angle of at least 40° up to 90° is an angle of deviation from a plane of the substrate.

14. The liquid crystal apparatus of claim 10, wherein the LC molecules on a first region of the substrate have a first pretilt angle, wherein the LC molecules on a second region of the substrate have a second pretilt angle, and wherein the first and second pretilt angles are different.

15. A method of tunable photoalignment comprising:
providing an LC assembly including a substrate, an alignment film including brilliant yellow (BY) on the substrate, and liquid crystal (LC) molecules on the alignment film, with the BY between the substrate and the LC molecules;
exposing the LC assembly to first obliquely incident unpolarized light at a first oblique angle of incidence relative to a surface of the substrate to establish a first pretilt angle in the liquid crystal molecules; and
exposing the LC assembly to second obliquely incident unpolarized light at a second oblique angle of incidence relative to the surface of the substrate to establish a second pretilt angle in the liquid crystal molecules, wherein the first and second oblique angles of incidence are different, and wherein the first and second pretilt angles are different.

16. The method of claim 15,
wherein exposing the LC assembly to the first obliquely incident unpolarized light comprises exposing the LC molecules on a region of the substrate to the first obliquely incident unpolarized light to establish the first pretilt angle in the liquid crystal modules on the region of the substrate, and
wherein exposing the LC assembly to the second obliquely incident unpolarized light comprises, after exposing the LC molecules to the first obliquely incident unpolarized light, exposing the LC molecules on the region of the substrate to the second obliquely incident unpolarized light to establish the second pretilt angle in the liquid crystal modules on the region of the substrate to provide temporal control of LC molecule pretilt angles on the region of the substrate.

17. The method of claim 15,
wherein exposing the LC assembly to the first obliquely incident unpolarized light comprises exposing the LC molecules on a first region of the substrate to the first obliquely incident unpolarized light to establish the first pretilt angle in the liquid crystal modules on the first region of the substrate, and
wherein exposing the LC assembly to the second obliquely incident unpolarized light comprises exposing the LC molecules on a second region of the substrate to the second obliquely incident unpolarized light to establish the second pretilt angle in the liquid crystal modules on the second region of the substrate to provide spatial control of LC molecule pretilt angles on the first and second regions of the substrate.

18. The method of claim 15, wherein providing the LC assembly comprises, providing the alignment film on the substrate, exposing the alignment film to a linearly polarized light source with a wavelength between 400 nm and 550 nm, and providing liquid crystal molecules on the alignment film.

19. The method of claim 18, wherein exposing the alignment film to the linearly polarized light source provides azimuthal alignment of the LC molecules.

20. The method of claim 15, wherein the first oblique angle of incidence is greater than the second oblique angle of incidence, and wherein the first pretilt angle is less than the second pretilt angle.

21. The method of claim 15, wherein the first oblique angle of incidence is less than the second oblique angle of incidence, and wherein the first pretilt angle is greater than the second pretilt angle.

22. The method of claim 15, wherein the first and second pretilt angles are angles of deviation from the plane of the substrate.

23. The method of claim 15, wherein the first pretilt angle is in a range of at least 40° up to 90°, and wherein the second pretilt angle is in a range of at least 40° up to 90°.

24. The method of claim 15, wherein the LC molecules have a uniform azimuthal alignment.

* * * * *